United States Patent
Robotham et al.

(10) Patent No.: US 7,327,735 B2
(45) Date of Patent: Feb. 5, 2008

(54) SYSTEM AND METHOD FOR DETECTING LOST MESSAGES TRANSMITTED BETWEEN MODULES IN A COMMUNICATION DEVICE

(75) Inventors: Robert E Robotham, Ottawa (CA); Kishor Mistry, Kanata (CA)

(73) Assignee: Alcatel Canada Inc., Kanata (CA)

( * ) Notice: Subject to any disclaimer, the term of this patent is extended or adjusted under 35 U.S.C. 154(b) by 1020 days.

(21) Appl. No.: 10/304,701

(22) Filed: Nov. 27, 2002

(65) Prior Publication Data

US 2004/0100964 A1    May 27, 2004

(51) Int. Cl.
H04L 12/28 (2006.01)
H04L 12/66 (2006.01)

(52) U.S. Cl. ............ 370/394; 370/419; 370/474; 370/389; 370/352

(58) Field of Classification Search ............ 370/394, 370/389, 474, 242, 245, 392, 231, 419, 400, 370/465, 473; 710/52, 213
See application file for complete search history.

(56) References Cited

U.S. PATENT DOCUMENTS

| | | | |
|---|---|---|---|
| 4,617,657 A | 10/1986 | Drynan et al. | |
| 5,245,616 A | 9/1993 | Olson | |
| 5,528,605 A | 6/1996 | Ywoskus et al. | |
| 6,128,283 A | 10/2000 | Sabaa et al. | |
| 6,134,237 A * | 10/2000 | Brailean et al. | 370/394 |
| 6,151,644 A * | 11/2000 | Wu | 710/52 |
| 6,161,207 A | 12/2000 | Lockhart et al. | |
| 6,335,933 B1 * | 1/2002 | Mallory | 370/394 |
| 6,389,016 B1 * | 5/2002 | Sabaa et al. | 370/389 |
| 6,545,981 B1 * | 4/2003 | Garcia et al. | 370/242 |
| 6,629,285 B1 * | 9/2003 | Gerendai et al. | 714/748 |
| 7,035,214 B1 * | 4/2006 | Seddigh et al. | 370/231 |
| 2002/0172192 A1 | 11/2002 | Hunzinger et al. | |

FOREIGN PATENT DOCUMENTS

| | | |
|---|---|---|
| WO | WO 98/15090 | 4/1998 |
| WO | WO 01/97438 | 12/2001 |

* cited by examiner

Primary Examiner—Hanh Nguyen
(74) Attorney, Agent, or Firm—McCarthy Tetrault LLP

(57) ABSTRACT

A method and module for tracking transmission of messages being sent from a transmitting module to a receiving module in a communication device is provided. The method includes the step of (a) receiving a message at the receiving module. The method also includes the step of (b) evaluating the received message to determine whether the received message was received by the receiving module in a proper sequence to a previous message, if any, sent by the transmitting module. The method further includes the step of (c) generating an acknowledgement message from the receiving module to the transmitting module, the acknowledgement message including an indicator, a value of the indicator indicating whether the previous message, if any, transmitted from the transmitting module to the receiving module immediately before the received message was received by the receiving module.

10 Claims, 9 Drawing Sheets

SYSTEM AND METHOD FOR DETECTING LOST MESSAGES TRANSMITTED BETWEEN MODULES IN A COMMUNICATION DEVICE

FIELD OF THE INVENTION

The invention relates to a system and method for tracking messages which are transmitted between two modules in a communication device. In particular, the invention relates to a method of detecting when a sent message is not received by the destination module.

BACKGROUND OF INVENTION

In a communication device, it is typical that functionality for the device is embodied into several modules. For example, in a communication switch, modules include line cards, switching fabrics and control systems. In turn, each module may itself comprise several submodules. This may continue iteratively for sub-modules. As circuit densities increase on integrated circuits, such circuits are commonly developed as a series of interconnected modules. Signals are communicated between modules through connections between modules. Due to the increasing densities and operating frequencies of the integrated circuits, signals carried on the connections are prone to contain errors.

For the modules of a communication device, a messaging system is commonly used. Therein, each module may generate a message having administrative and payload information. The administrative information may include the intended destination of the message, the size of the message and error management information. The message is transmitted over a communications link from the source module to the destination module.

Frequently, messages and data packets processed by a communication device must be maintained in some order. A known method of tracking data packets is to associate a sequence number with each packet. When a communication device receives a packet, its modules process the packet internally and eventually the device transmits the packet to another communication device. In order to facilitate the internal processing of the packets by the communication device, frequently a separate message is associated with each packet. The messages are transmitted between the modules in conjunction with the processing of the related packets by the modules. It will be appreciated that as the messages contain administrative information regarding their packets, the modules which process the messages may not necessarily be the same modules which process the packets. As an example, in processing a packet, one module may be responsible for determining an action for a packet (e.g. queue, discard, modify etc) and another module may perform the action.

When transmitting messages, a module which transmits a message needs to know whether a transmitted message was received by the destination module. A failure in the communications link or an error in the message itself may cause the message to be lost. As a solution, prior art messaging systems track messages by having a module which receives a message generate and transmit an acknowledgement (ACK) message back to the transmitting module. When the transmitting module eventually receives the ACK message, it knows that the transmitted message was received.

There are deficiencies with the transmit/ACK message scheme. For example, if a failure occurs when transmitting the initial message by the transmitting module, the intended receiving module will not receive the message and will not generate a replying ACK message. In this situation the transmitting module will be waiting, perhaps indefinitely, for the ACK message. If a failure occurs when transmitting the ACK message by the receiving module, the originating transmitting module will not receive the ACK message and will not have knowledge that the original message was, in fact, successfully received by the receiving module. These failures are not equivalent in that the receiving module is in a different state either having seen the original message or not. There are many situations in which the loss of a message may result in a persistent impairment to the system's operation. Given that the transmit/ACK messaging scheme does not differentiate between these failure mechanisms, the only corrective action to take may be to reset the system. Evidently, this will disrupt the operation of the system.

There is a need for a system and method for providing improved messaging scheme between two modules wherein individual failures of transmission of messages between the modules can be detected and accommodated.

SUMMARY OF INVENTION

In a first aspect, a method of tracking transmission of messages being sent from a transmitting module to a receiving module in a communication device is provided. The method includes the step of (a) receiving a message at the receiving module. The method also includes the step of (b) evaluating the received message to determine whether the received message was received by the receiving module in a proper sequence to a previous message, if any, sent by the transmitting module. The method further includes the step of (c) generating an acknowledgement message from the receiving module to the transmitting module, the acknowledgement message including an indicator, a value of the indicator indicating whether the previous message, if any, transmitted from the transmitting module to the receiving module immediately before the received message was received by the receiving module.

If step (b) determines that the received message was not received in the proper sequence, the value of the indicator may indicate that the previous message was not received by the receiving module.

The method may further include the step of (d) transmitting the acknowledgement message to the transmitting module.

The messages and the acknowledgement message may be associated with packets transmitted from the transmitting module to the receiving module.

Each the acknowledgement message may include a first field including a value indicating an acknowledgement response for the received message and a second field including one of: (i) the value of the indicator; and (ii) a value indicating an acknowledgement response for the previous message transmitted from the transmitting module to the receiving module immediately before the received message.

The acknowledgement response for the previous message and the acknowledgement response for the received message may indicate, respectively, whether the previous message and the received message were accepted by the receiving module.

The method may further include the steps of (e) receiving the acknowledgement message sent by the receiving module at the transmitting module and (f) determining whether the received acknowledgement message was received by the transmitting module in a proper sequence to a previous acknowledgement message, if any, sent by the receiving module.

Each acknowledgement message may further include a sequence number. If the step (b) determines that the received message was not received in the proper sequence, the step (c) may set the sequence number of the acknowledgement message to a value so indicating. The step (f) may determine whether the received acknowledgement message was received by the transmitting module in a proper sequence to a previous acknowledgement message based on the value of the sequence number of the received acknowledgement message.

The method may further include the step of (g) if the received acknowledgement message was not received by the transmitting module in the proper sequence, evaluating the value of the second field to determine whether the previous message transmitted from the transmitting module to the receiving module immediately before the received message was received by the receiving module.

The method may further include the step of (h1) if the received acknowledgement message was not received by the transmitting module in a proper sequence and if the value of the second field indicates that the previous message transmitted from the transmitting module was not received by the receiving module, synchronizing an internal state of the transmitting module with the receiving module to reflect loss of the previous message.

The method may further include the step of (h2) if the received acknowledgement message was not received by the transmitting module in a proper sequence and if the value of the second field indicates that the previous message transmitted from the transmitting module was received by the receiving module, processing the acknowledgement response for the previous message contained in the second field.

The transmitting module may allocates memory associated with the messages transmitted to the receiving module. The method may further include the step of (i) reallocating the memory in response to the value of the first field and the value of the second field.

In a second aspect, a method of tracking transmission of acknowledgement messages being sent from a receiving module to a transmitting module in a communication device is provided. Each of the acknowledgement messages is associated with a message sent from the transmitting module to the receiving module. The method includes the steps of (a) receiving an acknowledgement message sent by the receiving module at the transmitting module, the received acknowledgement message including an indicator, a value of the indicator indicating whether a previous message, if any, transmitted from the transmitting module to the receiving module immediately before a message associated with the received acknowledgement message was received by the receiving module. The method also includes the step of (b) determining whether the received acknowledgement message was received by the transmitting module in a proper sequence to a previous acknowledgement message, if any, sent by the receiving module.

In a third aspect, a receiving module for tracking transmission of messages being sent from a transmitting module to the receiving module in a communication device is provided. The receiving module includes a first input adapted to receive a message and a sequence evaluation unit adapted to evaluate the received message to determine whether the received message was received in a proper sequence to an earlier message, if any, sent by the transmitting module. The receiving module also includes an acknowledgement unit adapted to generate an acknowledgement message for transmission from the receiving module to the transmitting module, the acknowledgement message including an indicator, a value of the indicator indicating whether a previous message, if any, transmitted from the transmitting module to the receiving module immediately before the received message was received by the receiving module.

In a third aspect, a transmitting module for tracking transmission of acknowledgement messages being sent from a receiving module to the transmitting module in a communication device is provided. The transmitting module includes a first input adapted to receive an acknowledgement message sent by the receiving module at the transmitting module, the received acknowledgement message including an indicator, a value of the indicator indicating whether a previous message, if any, transmitted from the transmitting module to the receiving module immediately before a message associated with the received acknowledgement message was received by the receiving module. The transmitting module also includes a sequence evaluation unit adapted to determine whether the received acknowledgement message was received by the transmitting module in a proper sequence to a previous acknowledgement message, if any, sent by the receiving module.

In other aspects, various combinations and subset of the above aspects are provided.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes).

DETAILED DESCRIPTION OF EMBODIMENTS

Figure 1A:
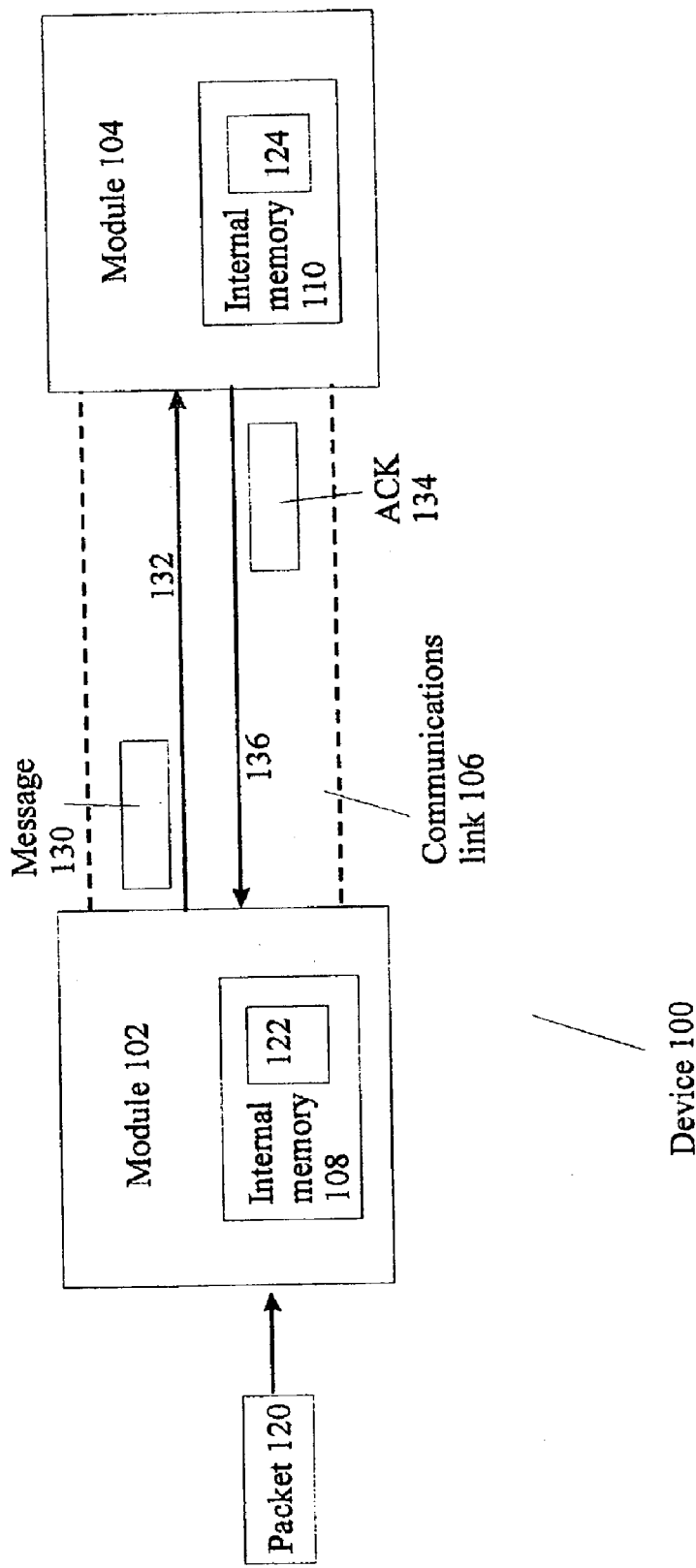
FIG. 1A is a block diagram of two modules of a prior art communication device.

The description which follows, and the embodiments described therein, are provided by way of illustration of an example, or examples, of particular embodiments of the principles of the present invention. These examples are provided for the purposes of explanation, and not limitation, of those principles and of the invention. In the description which follows, like parts are marked throughout the specification and the drawings with the same respective reference numerals.

Prior Art Messaging Scheme

In order to illustrate the features of the embodiments, first, features and issues of a prior art messaging scheme are provided.

Referring to FIG. 1A, prior art communication device 100 in a communication switch is shown. Communication switch and, accordingly, communication device 100 process transmission of data traffic. As is known, in processing data traffic, the switch may segment the data traffic into a series of portions, or packets. An upstream device to the switch may also have already performed segmentation. Each packet is an ordered element relative to the other packets of the data traffic. The packets are each individually processed and transmitted by the communication device. To aid in tracking processing and transmission of the packets, communication device uses a series of discrete messages to track each packet. Device 100 has module 102 and module 104 to track the packets and their messages during processing of the packets. Modules 102 and 104 have internal memories 108 and 110, respectfully, to store information relating to the packets and messages. Modules 102 and 104 transmit their messages to each other over communications link 106.

When a packet 120 arrives at module 102, module 102 allocates memory 122 from internal memory 108 to store packet 120. In processing the transmission of packet 120, messages 130 are generated by modules 102 and 104 and transmitted to each other over communications link 106. Module 102 transmits message 130 to module 104 over communications link 106, indicated by arrow 132, to process information related to packet 120. When module 104 receives message 130, it responds by transmitting an ACK 134 to module 102 over communications link 106, indicated by arrow 136.

Figure 1B:
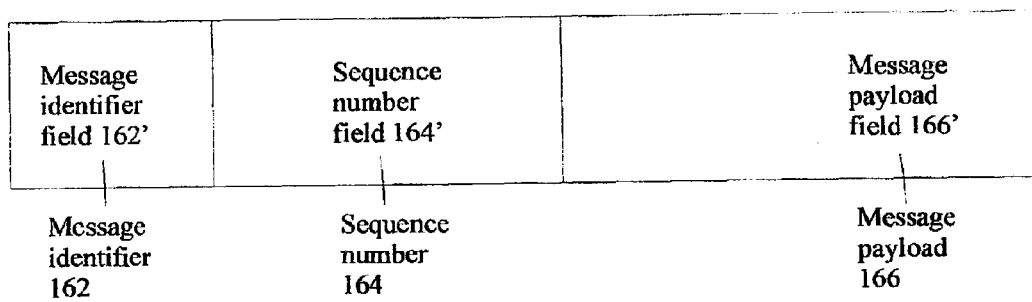
FIG. 1B is a block diagram of a message and its fields generated and transmitted by the device of FIG. 1A.
Figure 1C:
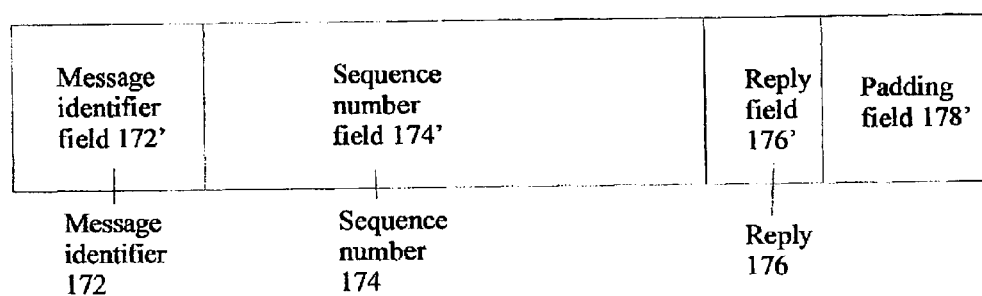
FIG. 1C is a block diagram of an acknowledgement (ACK) message and its fields generated and transmitted by the device of FIG. 1A.

Referring to FIG. 1B, in one prior art implementation, message 130 comprises 4 bytes and is segmented into a series of fields, including: message identifier field 162' (4 bits) containing message identifier 162; sequence number field 164' (8 bits) containing sequence number 164; message payload 166' (20 bits) containing message payload 166. Referring to FIG. 1C, in one prior art implementation, ACK 134 comprises 2 bytes and is also segmented into a series of fields, including: message identifier field 172' (4 bits) containing message identifier 172; sequence number field 174' (8 bits) containing sequence number 174; reply field 176' (1 bit) containing reply 176; and padding field 178' (3 bits). In this example, reply field 176' contains a response to its corresponding message 130 indicating whether the corresponding packet 120 should be accepted or discarded. Sequence numbers placed in fields 164 and 174 enable messages to be sequenced.

Figure 2:
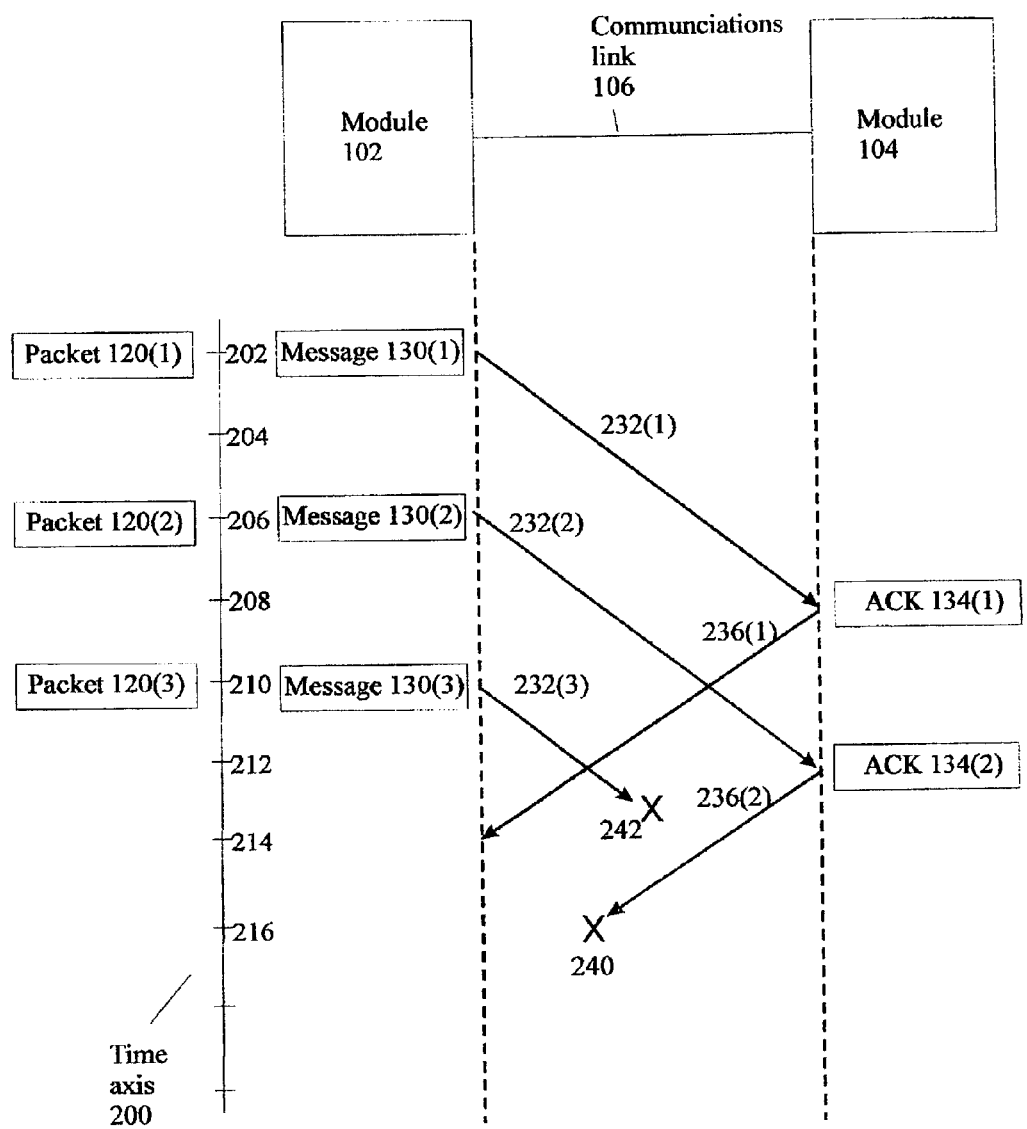
FIG. 2 is a block diagram of a timeline illustrating a progression of transmission of a series of messages and related ACK messages by the device of FIG.1A.

Referring to FIG. 2, three scenarios of exchanges of messages 130 and ACKs 134 between modules 102 and 104 over communications link 106 are presented. Time axis 200 demarks times of transmission messages 130 and ACKs 134 between modules 102 and 104.

In a first scenario, a series of messages 130 and ACKs 134 are successfully exchanged between modules 102 and 104. Therein, at time 202, packet 120(1) arrives at module 102, which triggers module 102 to generate and transmit a message 130(1) to module 104. Module 102 transmits message 130(1) to module 104 over communications link 106, as indicated by arrow 232(1). At time 208, module 104 receives message 130(1) and, responsive to receiving message 130(1), generates ACK 134(1). Accordingly, module 104 transmits ACK 134(1) to module 102, indicated by arrow 236(1), which arrives at module 102 at time 214. By receiving ACK 134(1), module 102 can determine that message 130(1) has been received by module 104.

In a second scenario, a failure point is introduced in the exchange of messages 130 and ACKs 134. Therein at time 206, packet 120(2) arrives at module 102, triggering the generation and transmission of message 130(2) to module 104 over communications link 106, indicated by arrow 232(2). At time 212, module 104 receives message 130(2) and generates ACK 134(2), which is transmitted to module 102, as indicated by arrow 236(2). However, fault 240 in communications link 106 prevents ACK 134(2) from being received at module 102. Accordingly there is a disconnect of synchronization between the series of messages 130 and the corresponding series of processed packets 120.

In a third scenario, a failure point is introduced in the messaging process from module 102 to module 104. At time 210, packet 120(3) arrives at module 102, triggering the generation and transmission of message 130(3) to module 104, indicated by arrow 232(3). However, fault 242 prevents message 130(3) from arriving at module 104. Therefore, module 104 does not generate and transmit an ACK 134 for message 130(3).

In the second and third scenarios, device 100 must respond to the fault condition to recapture memory and resynchronize the information contained in modules 102 and 104. If this is not done, the coordination of the modules will likely be impaired or lost entirely and memory that has been used may not be reallocatable. As similar fault conditions happen again, additional memory may become unusable, eventually incapacitating the communication device.

Messages, including ACK messages, of prior art systems and the embodiment may use various error detection schemes (or error detection and correction schemes) including parity, CRC and other known encoding schemes. Encoding schemes that provide error detection and correction tend to not be bandwidth efficient. Error detection schemes can be very effective at preventing the passing of erroneous information, however, the response is generally limited to discarding the errored message.

Basic Features of the Embodiment

Briefly, a communication device of the embodiment has a first module and a second module communicating over a communications link between the first and second modules. In a typical messaging system, the first module transmits a message to the second module. The second module replies to the message with an acknowledgement message ("ACK message", or simply "ACK"). The ACK signifies that the second module has received the current message. However, the ACK also contains an indication whether the second module had received a previous message, in particular, the last message which was sent before the current message. The messages have a sequence number to distinguish themselves from each other and to identify their order with each other. The second module also tracks the sequence number of a received message and can determine whether a previous message was received. The messaging scheme of the embodiment allows tracking of current messages against previously received messages and expected messages.

Messaging Scheme and Communication Device of an Embodiment

Figure 3A:
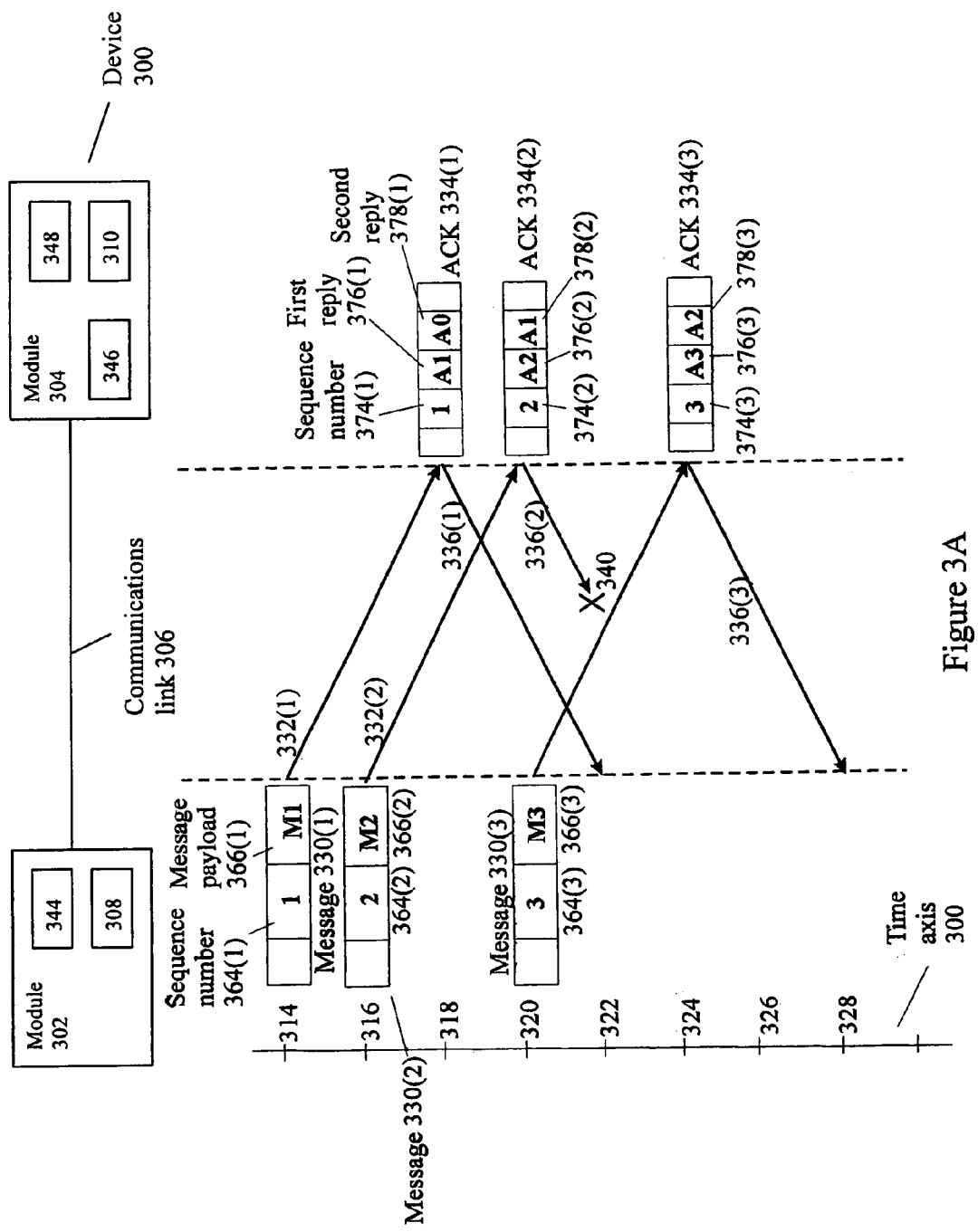
FIG. 3A is a block diagram of a communication device of an embodiment and a timeline illustrating a progression of transmission of a series of messages and related ACK messages generated and processed by the device.

Referring to FIG. 3A, communication device 300 of an embodiment is similar to device 100 in that it has a first module 302 and a second module 304 connected by a communications link 306. Differences relating to the invention are provided in a messaging scheme used for communications sent between the modules. In particular, module 302 has internal memory 308 and module 304 has internal memory 310. Modules 302 and 304 in device 300 transmit messages 330 to one another to process packets (not shown) arriving at device 300. When module 304 receives message 330, it transmits an ACK 334 to module 302. Modules 302 and 304 may be ASICs which process aspects of the packets being transmitted by the communication switch having appropriate control logic to implement the message processing described herein. Alternatively, the message processing may be embodied in appropriate software/firmware modules operating on the modules. In the embodiment, the communications link 306 is preferably an optical signalling link. Contents of messages 330 and ACKs 334 may have to be converted for transmission following the transmission protocols of communications link 306. In different embodiments, modules 302 and 304 may be on the same functional element, e.g. the same line card, or they may be on different functional elements, e.g. module 302 may be on a line card and module 304 may be in the control system. In the particular implementation, the system being considered as a unit is a portion of a line card and the two modules are ASICs located on that line card.

In device 300, each message 330 is associated with a sequence number which acts as a historical identifier, indicating its ordinal location in the set of messages 330 generated for the corresponding set of ordered packets. By tracking sequence numbers, when a module receives a message 330, the module can extract the contained sequence number and determine whether the just-received message is in sequence with the message 330 received immediately before it. Also the module can determine what message 330 is expected to be received immediately after it. Sequence number generation can be performed in any manner in which sequence numbers do not repeat within a period of time (comparable to the transmission time for a transmission and receipt of a message/ACK signal sequence) and which can be independently generated in two locations with the same values. A counter (with wrap-around at maximum value) is a simple example that meets these requirements, it has the further advantage that it is simple to determine the preceding or following values from any given value. In this way, if module 304 stores the sequence number of the last message 330 it received, it can determine if the next message 330 it receives is in sequence or not. And if not, it can determine which message(s) 330 were not received. Similarly, if module 302 stores the sequence number of the last ACK 334 it received, it can determine if the next ACK 334 it receives is in sequence or not. And if not, it can determine which ACK(s) 334 were not received.

Figure 3B:
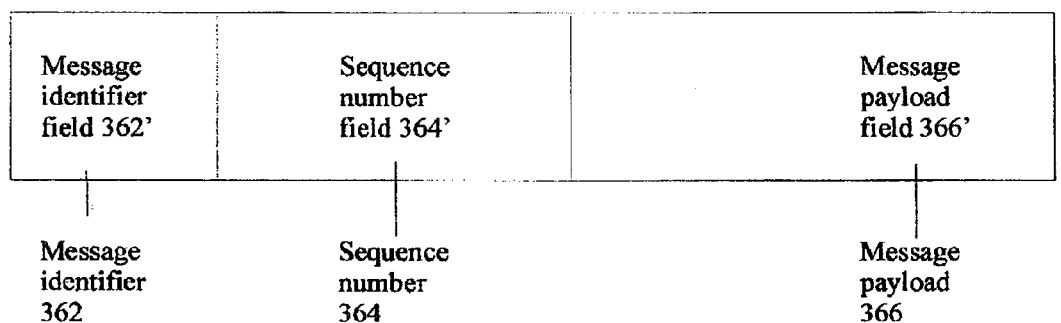
FIG. 3B is a block diagram of a message and its fields generated and transmitted by the device of FIG. 3A.

Referring to FIG. 3B, message 330 (generated by module 302) comprises at least the following fields: message identifier field 362' (4 bits) containing message identifier 362; sequence number field 364' (8 bits) containing sequence number 364; and message payload field 366' (20 bits) containing payload 366. For a received message 330, module 304 can use the sequence number 364 to determine what message 330 should be received after the just received message 330 and can determine whether there is a message gap, i.e. a missing message 330, between the message 330 received just before the just received message 330. Gaps in the sequence are evaluated at module 302 by a sequence evaluation unit 344.

Figure 3C:
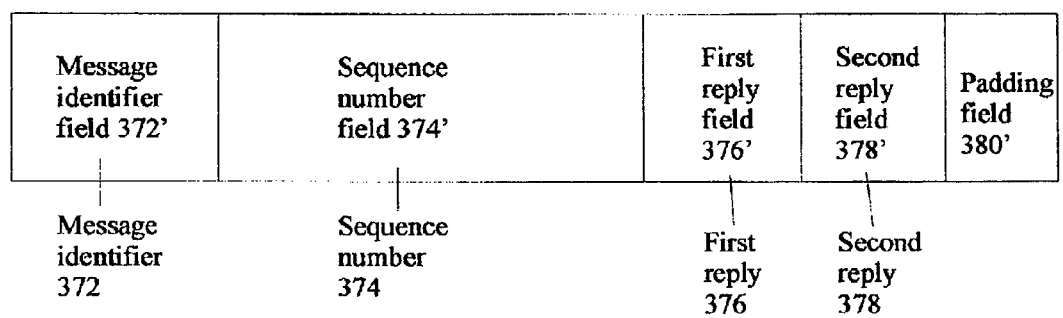
FIG. 3C is a block diagram of an ACK message and its fields generated and transmitted by the device of FIG. 3A.

Referring to FIG. 3C, ACK 334 is generated by acknowledgement unit 348 at module 304 for transmission to module 302 and is responsive to a received message 330. ACK 334 has at least the following fields: message identifier field 372' (4 bits) containing message identifier 372; sequence number field 374' (8 bits) containing sequence number 374; first reply field 376' (1 bit) containing first reply 376 which is an acknowledgement response (accept or discard) for its corresponding message; second reply field 378' (2 bits) containing second reply 378; and padding field 380' (1 bit). It will be appreciated that in the embodiment, ACK 334 is the same size as ACK 134 (FIG. 1C). Accordingly, there is low bandwidth overhead for the signalling scheme of the embodiment. Further, in many cases there may be no increase in signalling bandwidth requirements.

Second reply 378 provides an indication of the acknowledgement response of a first reply 376 sent in the immediately previous ACK 334. Accordingly, module 304 stores first reply 376 of the immediately previous ACK 334 to populate second reply 378 of the next ACK 334 if no message gap occurs. Module 302 also stores sequence numbers 374 of previously received ACKs 334 and recognises when a gap in the sequence of ACKs 334 received occurs. Gaps in the sequence are evaluated at module 302 by a sequence evaluation unit 344. A gap in the sequence prompts module 302 to read information from second reply 378. From the information contained, module 302 receives information from a lost ACK 334.

FIG. 3A illustrates two scenarios of an exchange of messages 330 and ACKs 334 between modules 302 and 304. Time axis 312 demarks times of transmission of messages 330 and ACKs 334 between modules 302 and 304.

In a first scenario, a normal, successful series of messages 330 and ACKs 334 are exchanged between modules 302 and 304. At time 314, module 302 generates and transmits message 330(1) to module 304 over communications link 306, indicated by arrow 332(1). Message 330(1) is populated with sequence number 364(1) and message payload 366(1) which contains processing instructions for module 304. Subsequently, message 330(1) arrives at module 304. Thereafter, at time 318, acknowledgement unit 348 of module 304 generates ACK 334(1) and populates it with sequence number 374(1), first reply 376(1) and second reply 378(1). Sequence number 374(1) contains a code, as a number, that is associated with sequence number 364(1) of message 330(1). In the embodiment, sequence number 374 for ACK 334 is set to the sequence number 364 for its message 330. First reply 376(1) contains the acknowledgement response for message 330(1) (indicated by "A1") while second reply 378(1) contains the acknowledgement response for the previous message, message 330(0) (not shown) (indicated by "A0"). Module 304 stores sequence number 364(1) and first reply 376(1) for future use. Module 304 transmits ACK 334(1) to module 302, indicated by arrow 336(1), which arrives at time 322. By tracking sequence numbers 374 with sequentially transmitted packets, when module 302 receives ACK 334(1), sequence evaluation unit 344 can extract the sequence number 374(1) therefrom and compare it with the previously received sequence numbers 374. It does this by comparing a sequence number 374 stored to sequence number 374(1) received. Sequence evaluation unit 344 can either count up from stored sequence number 374 or back from a next received sequence number 374 to determine whether there is a message gap. A gap in the sequence indicates that an ACK 334 was not received between the last two sequence numbers 374, i.e. the last two received ACKs 334. Sequence evaluation unit 344 determines that there is no message gap.

In a second scenario, an ACK 334 is lost en route to module 302 as a fault 340 is present in the communications link 306 shortly after time 322. Therein, at time 316, module 302 transmits message 330(2) to module 304 over communications link 306, indicated by arrow 332(2). Subsequently, message 330(2) arrives at module 304. At time 320, acknowledgement unit 348 generates ACK 334(2) which comprises sequence number 374(2), first reply 376(2) and second reply 378(2). Module 304 transmits ACK 334(2) over communications link 306, indicated by arrow 334, but it does not arrive at module 302 due to fault 340. Thereafter, at time 320, module 302 transmits message 330(3) to module 304 over communications link 306, indicated by arrow 332(3). Subsequently, message 330(3) arrives at module 304. At time 324, acknowledgement unit 348 generates ACK 334(3) and populates it with sequence number 374(3), first reply 376(3) and second reply 378(3). Second reply 378(3) contains the acknowledgement response provided to message 330(2) that did not arrive at module 302. Module 304 transmits ACK 334(3) to module 304, indicated by arrow 336(3). ACK 334(3) arrives at module 302 at time 328. Sequence evaluation unit 344 again compares the received sequence number 374(3) with the stored sequence number 374(1). Sequence evaluation unit 344 does this by either counting up from stored sequence number 374(1) or back from received sequence number 374(3). As the sequence number 374(3) for the current response is "3", as illustrated, sequence evaluation unit 344 determines whether the sequence number has the expected next value for the received ACK 334. As a "2" was expected for the "3" key and it was not provided, sequence evaluation unit 344 recognizes the discrepancy and notes that an error has occurred. Sequence evaluation unit 344 indicates this error to module 302 which then reads the information that was lost from second reply 378(3). At this time, module 302 has been provided with the previously lost acknowledgement response to message 330(2).

Figure 4:
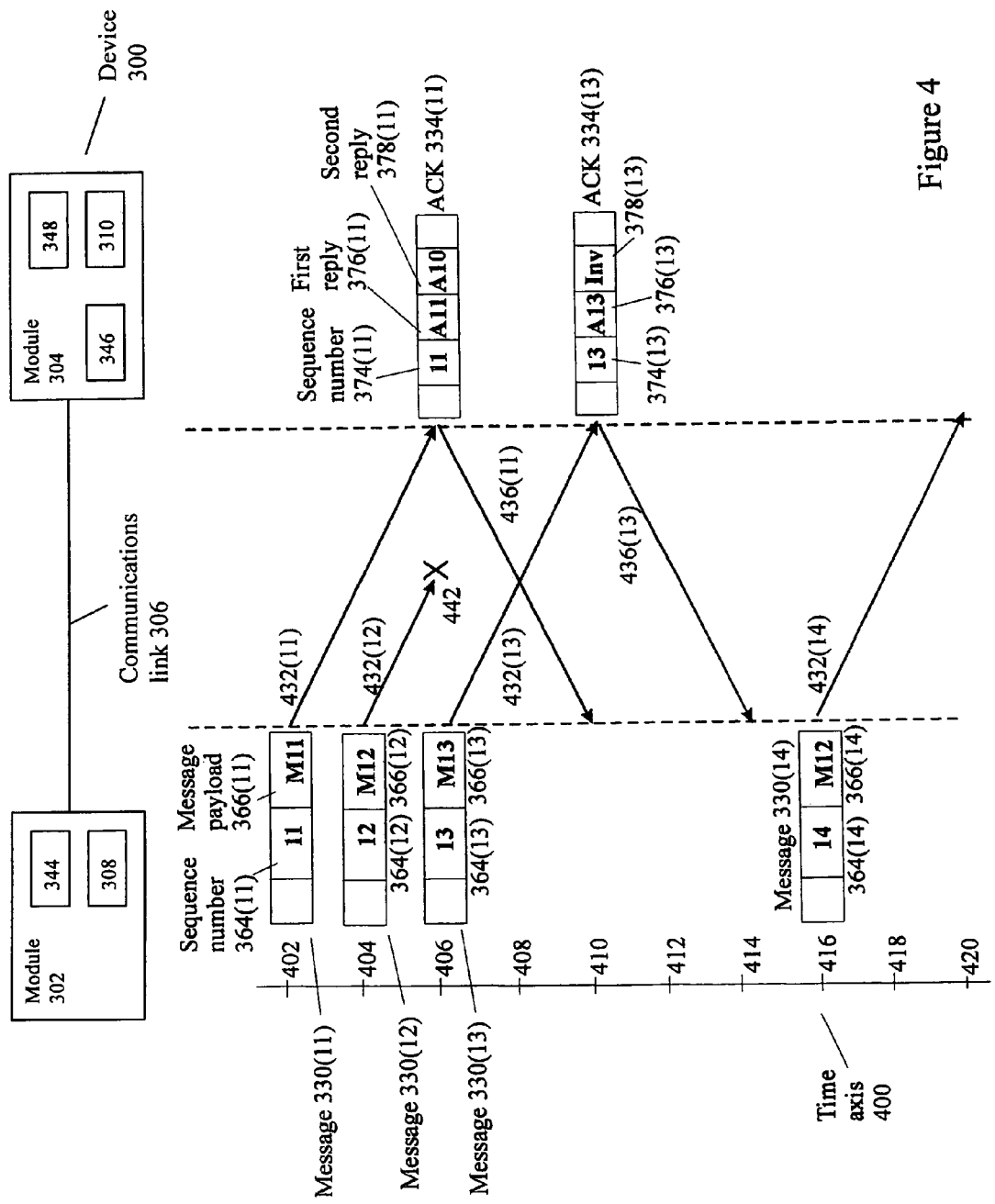
FIG. 4 is a block diagram of a timeline illustrating another progression of transmission of a series of messages and related ACK messages generated and processed by the device of FIG. 3A.

Next, referring to FIG. 4, module 304 tracks sequence numbers 364 to determine whether a previously transmitted message 330 was received. Module 304 determines whether there is a message gap by storing sequence numbers 364 from previous messages 330. After receiving a message 330 with a sequence number 364, module 304 compares sequence number 364 with the stored sequence number 364. Module 304 can either count up from stored sequence number 364 or back from received sequence number 364 to determine whether the sequence number 364 received has the expected value. Gaps in the sequence are evaluated at module 304 by a sequence evaluation unit 346. If module 304 determines that it did not receive a previously transmitted message 330, second reply 378 in the current ACK 334 is set to a flagging value to indicate this condition by module 304. ACKs 334 are generated at module 304 by an acknowledgement unit 348. Module 304 generates a value for sequence number 374 that indicates a gap in the sequence of ACKs 334. ACK 334 is transmitted to module 302 with sequence number 374. Module 302 checks for gaps in sequence numbers 374 received. Gaps in the sequence are evaluated at module 302 by a sequence evaluation unit 344. A gap in the sequence prompts module 302 to read information from second reply 378 where the flagging value acts as an indicator to indicate to module 302 that a previously transmitted message 330 was not received by module 304. Module 302 can then resynchronize itself with module 304 by updating its internal state to reflect the loss of message 330. Synchronization may be achieved by such means as discarding information relating to the lost message 330 or retransmitting the lost message 330. Accordingly, module 302 may store transmitted messages 330 if they are to be retransmitted if a message gap occurs.

In FIG. 4, an example is illustrated of a message 330 being lost en route to module 304 of device 300. Time axis 400 demarks times of transmissions of messages and ACKs between modules 302 and 304. At time 402, module 302 generates message 330(11) for transmission to module 304 over communications link 306, indicated by arrow 432(11). Message 330(11) is populated with sequence number 364(11) and message payload 366(11) which contains the processing parameters for module 304. Subsequently, message 330(11) arrives at module 304.

Sequence evaluation unit 346 of module 304 compares sequence number 364(11) with a previously stored sequence number 364. Sequence evaluation unit 346 determines that no message gap has occurred.

At time 406, acknowledgement unit 348 generates ACK 334(11) and populates it with sequence number 374(11), first reply 376(11) and second reply 378(11). First reply 376(11) contains the acknowledgement response for message 330(11) (indicated by "A11") while second reply 378(11) contains the acknowledgement response for the previous message, message 330(10) (not shown) (indicated by "A10"). Module 304 stores sequence number 364(11) and first reply 376(11) for future use. Module 304 transmits ACK 334(11) to module 302, indicated by arrow 436(11), which arrives at time 410. Sequence evaluation unit 344 at module 302 similarly compares sequence number 374(11) with a previously stored sequence number 374 and determines that no message gap has occurred.

At time 404, module 302 generates and transmits message 330(12) to module 304 over communications link 306, indicated by arrow 432(12). However, due to fault 442, message 330(12) does not arrive at module 304. Therefore, acknowledgement unit 348 has no trigger to generate ACK 334.

At time 406, module 302 transmits message 330(13) to module 304 over communications link 306, indicated by arrow 432(13). Subsequently, message 330(13) arrives at module 304. Sequence evaluation unit 346 extracts sequence number 364(13) from message 330(13) and compares it with stored sequence number 364(11). Sequence evaluation unit 346 does this by either counting up from stored sequence number 364(11) or back from received sequence number 364(13). As the sequence number 364(13) for the current message is "13", as illustrated, Sequence evaluation unit 346 determines whether the sequence number has the expected next value for the last received message 330. As a "12" was expected for the "13" key and it was not provided, an error has occurred. Accordingly, acknowledgement unit 348 will populate second reply 378(13) with an "invalid" flag indicating that the previous message 330 was not received (indicated by "inv").

At time 410, acknowledgement unit 348 generates ACK 334(13) and populates it with sequence number 374(13), first reply 376(13) and second reply 378(13). Module 304 generates a value for sequence number 374(13) that indicates a gap in the sequence of ACKs 334. This is most easily achieved by copying the value for sequence number 364(13) from message 330(13). First reply 376(13) contains the acknowledgement response for message 330(13) (indicated by "A13") while second reply 378(13) contains the "invalid" flag.

Module 304 transmits ACK 334(13) to module 302, indicated by arrow 436(13), which arrives at time 414. Sequence evaluation unit 344 again checks for gaps in sequence numbers 374 received. Sequence evaluation unit 344 detects a gap in the sequence which prompts module 302 to read information from second reply 378(13). The "invalid" flag in second reply 378(13) indicates to module 302 that the previous message 330(12) did not arrive at module 304. Module 302 then resynchronizes itself with module 304. In this example, module 302 transmits message 330(14) to module 304, indicated by arrow 432(14), with the processing parameters that were lost due to fault 442. This is indicated by the value "M12" in the message payload 364(14) in message 330(14), originally transmitted in message 330(12). It will be appreciated that module 302 may resynchronize itself with module 304 by other means including discarding information relating to message payload 364(12).

Figure 5:
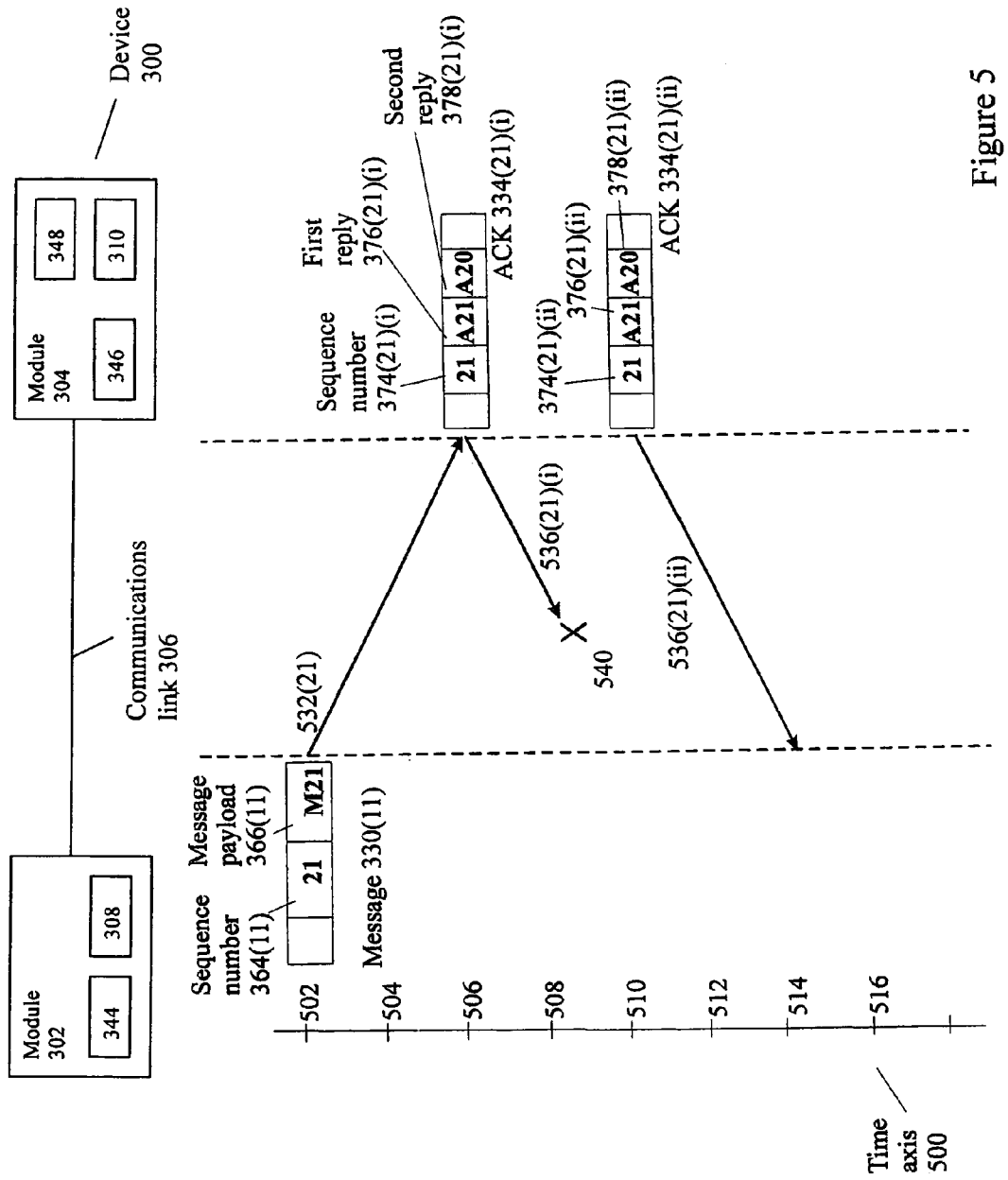
FIG. 5 is a block diagram of a timeline illustrating yet another progression of transmission of a series of messages and related ACK messages generated and processed by the device of FIG. 3A.

The basic algorithm and scheme of the embodiment described thus far does not track loss of a last ACK 334 to a set of messages 330. Device 300 deals with this situation in the following manner, illustrated by FIG. 5. Therein, time axis 500 demarks times of transmission of messages 330 and ACKs 334 between modules 302 and 304. A scenario is shown where the final ACK 334(1) to message 330(21) is lost en route to module 304, indicated by arrow 536(21)(i) terminating at fault 540. Module 304 monitors communications link 306 for excess bandwidth. If there is bandwidth available on communications link 306, module 304 retransmits ACK 334(1) to module 302, indicated by arrow 536 (21)(ii). Sequence evaluation unit 344, checking for gaps in the sequence, determines that ACK 334(21)(ii) is the next expected ACK 334 and processes it accordingly.

If the final message 330 from module 302 to module 304 is lost, then upon bandwidth being available on communications link 306, module 304 retransmits the previous ACK 334. The next ACK 334 contains the same information as the previous ACK 334 received by module 302. Sequence evaluation unit 344 at module 304, checking for gaps in the sequence, determines whether the sequence number 374 received matches the last sequence number 374. Module 302 thereby recognizes that the final message 330 was lost and retransmits final message 330.

Under idle conditions in which no messages are being transmitted from module 302 to module 304, module 304 will transmit the last valid ACK 334 that it has sent previously as bandwidth is available. To conserve usage of bandwidth, it may be desireable to limit the rate at which ACKs 334 are sent rather than using all idle bandwidth for this. In the initialization case where no message 330 has been received, an ACK 334 will be generated indicating that there have been no valid messages 330 received. A number of methods may be used to indicate this. First reply 376 may have a "valid/invalid" bit added to it, sequence number 374 may be given an invalid value or sequence number 374 may be initialized to the value that precedes the initial value of sequence number 374. For example if sequence number 374 is 8 bits long and module 302 initializes it to a binary number representing "0", then in this condition module 304 will send ACK 334 messages with sequence number 374 having a binary number representing "255".

Furthermore module 302 may provide a "time out" function in which if an ACK 334 is not received corresponding to a message 330 within some bounded period of time module 302 will consider message 330 to have been lost and react accordingly.

In the device of the embodiment, messaging between modules 302 and 304 is typically very reliable, i.e. relatively few messages 330 and ACKs 334 are lost compared to the number of messages 330 and ACKs 334 transmitted. However, for a high volume of messages 330 and ACKs 334 transmitted in device 300 this would still have modules 302 and 304 losing track of a notably large portion of their internal memories 308 and 310, respectively. The method of transmitting messages 330 and ACKs 334 of the embodiment works well since there is a low occurrence rate of loss of consecutive messages 330 or ACKs 334 in the normal operation of device 300. If the embodiment is not able to perform the corrections detailed above because the rate at which messages 330 and ACKs 334 are being lost in transmission exceeds the ability of the system to generate successfully transmitted messages between the modules, it may be assumed that a significant, non recoverable fault has occurred requiring the resetting of the system.

If the system described above loses messages 330 such that sequence number 374 received at module 302 indicates a gap of two or more sequence numbers 374, the particular embodiment, as described, may not be able to correct the gap and may not be able to guarantee the level of system correctness that is possible with the loss of single messages 330 or ACKs 334. In this case, module 302 can assume that the messages 330 for which an ACK 334 has not been received were lost, which module 302 may have already done due to the time out period being exceeded. Note that correct behaviour is not guaranteed since it may have been a number of ACK 334 messages that were lost. When a number of messages 330 and/or ACKs 334 are lost it is likley that link level error detection will raise alarms to a higher level device in the system which may trigger a system reset. If a sequence number 374 received at module 302 indicates a gap of two or more sequence numbers 374, this may be used by module 302 to raise an alarm which can in turn be used to trigger a system reset.

An extension of the embodiment to support the recovery of the system from the loss of consecutive messages without requiring a system reset will be described next. The number of consecutive messages whose loss can be recovered from can be engineered according to the expected rate of consecutive errors.

Messaging Scheme and Communication Device of an Embodiment tracking Consecutive Lost ACKs or Messages In situations where the loss of consecutive messages 330 or ACKs 334 is more likely to occur, the above described embodiment may be extended by increasing the length of the ACK 334 and transmitting a number of previous acknowledgement responses to the originating module. Accordingly, referring to FIG. 6A, communication device 600 is illustrated, which is an extension of an embodiment. Therein, device 600 is similar to device 300 in that it has a first module 602 and a second module 604 connected by a communications link 606. Modules 602 and 604 both have internal memories (not shown). Modules 602 and 604 transmit messages 630 to one another to process packets arriving at device 600. The module receiving the message 630 transmits an ACK 634 to the module originating the message 630.

As described with respect to module 304, sequence evaluation unit 644 at module 604 can track expected next messages 630 via the sequence number 664 and use sequence number 664 to determine whether there is a gap in sequence numbers 664 between the just received message 630 and the last received message 630.

Figure 6A:
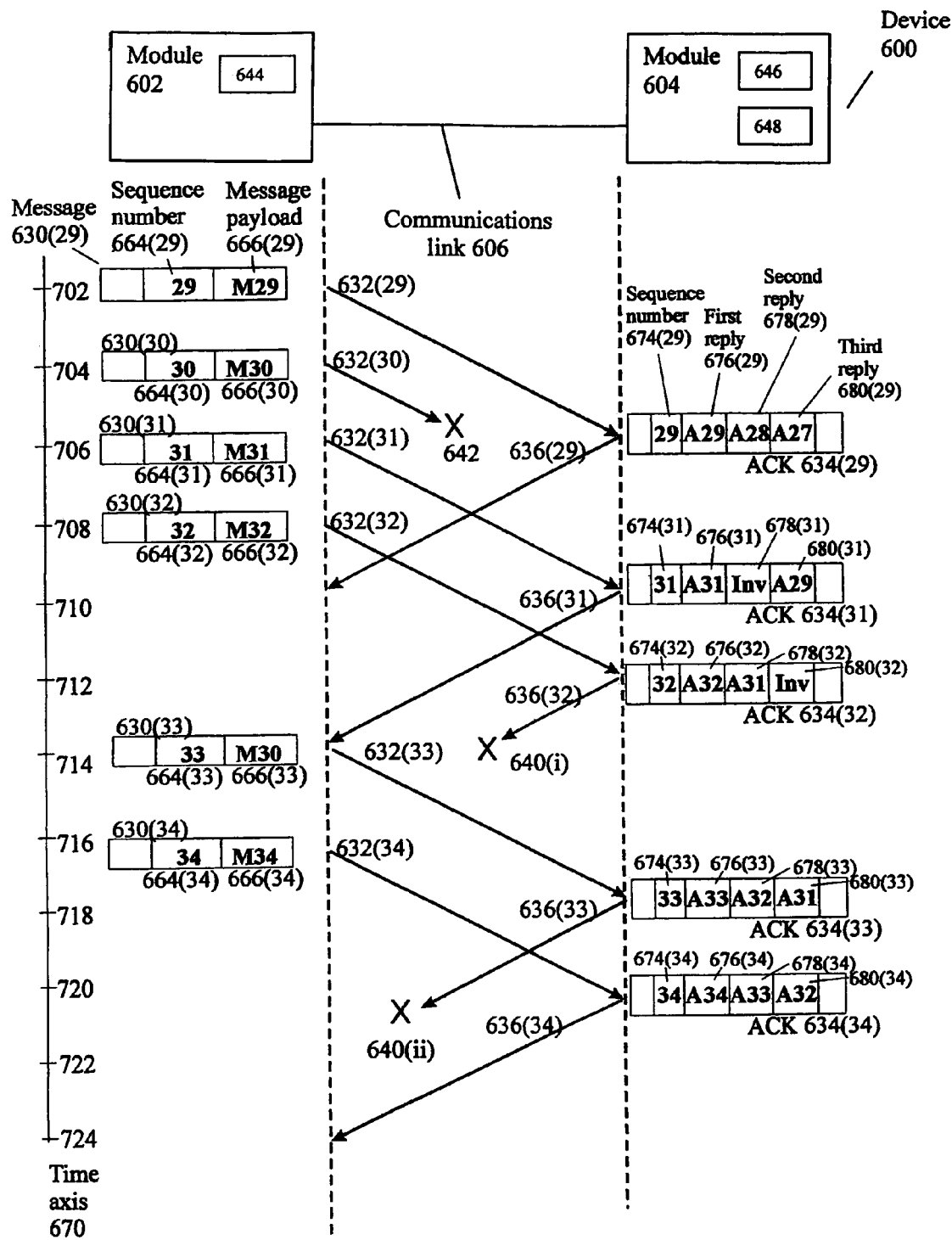
FIG. 6A is a block diagram of a timeline illustrating a progression of transmission of a series of messages and related ACK messages generated and processed by another embodiment of the device.
Figure 6B:
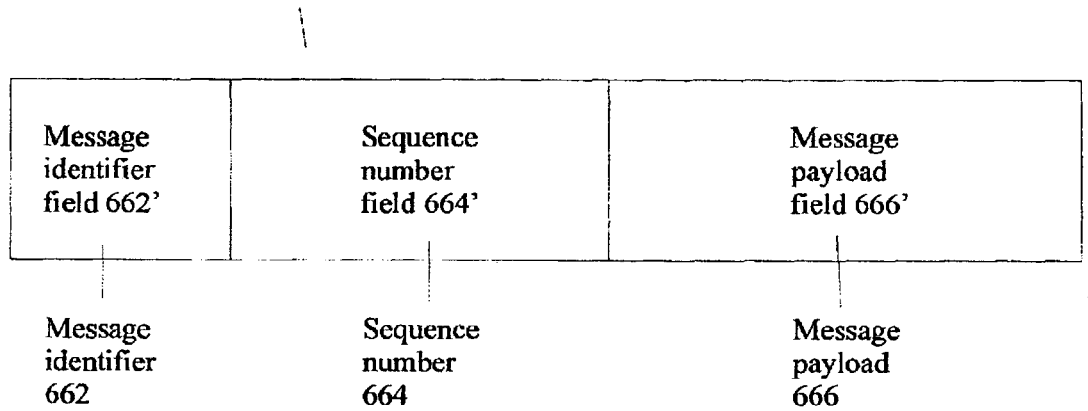
FIG. 6B is a block diagram of a message and its fields generated and transmitted by the device of FIG. 6A.

Referring to FIG. 6B, when module 602 generates a message 630, the message 630 has at least the following fields: message identifier field 662' (4 bits) containing message identifier 662; sequence number field 664' (8 bits) containing sequence number 664; and message payload 666' (20 bits) containing message payload 666.

Figure 6C:
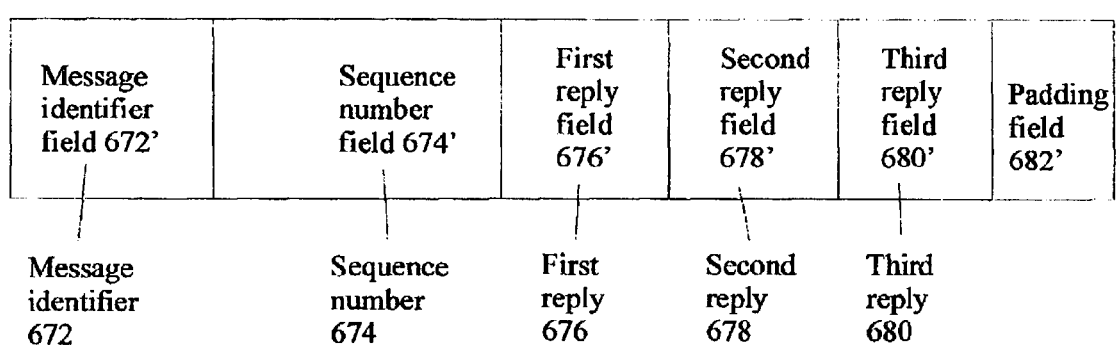
FIG. 6C is a block diagram of an ACK message and its fields generated and transmitted by the device of FIG. 6A.

Device 600 differs from device 300 in how it transmits ACKs 634. An ACK 634 generated by acknowledgement unit 648 at module 604 includes a series of two bit replies to the previous messages 630. In this embodiment, ACK 634 includes a reply to the previous message 630 and replies to the two previous messages 630. Referring to FIG. 6C, when module 604 provides an ACK 634 to module 602 responsive to a received message 630, ACK 634 has at least the following fields: message identifier field 672' (4 bits) containing message identifier 672; sequence number field 674' (8 bits) containing sequence number 674; first reply field 676' (1 bit) containing first reply 676 indicating whether the reply is to accept or decline; second reply field 678' (2 bits) containing second reply 678 providing a reply to the immediately previous message 630; third reply field 680' (2 bits) containing third reply 680 providing a reply to the message 630 transmitted previous to the immediately previous message 630; and padding field 682'. If module 602 did not receive an immediately previous ACK 634, second reply 678 acts as a retransmission of first reply 676 from the previous ACK 634. If module 602 did not receive an immediately previous ACK 634 or the ACK 634 prior to the immediately previous ACK 634, second reply 678 acts as a retransmission of first reply 676 from the immediately previous ACK 634 and third reply 680 acts as a retransmission of reply first 676 from the ACK 634 prior to the immediately previous ACK 634. To provide these features, module 602 stores the sequence number 674 of the last ACK 634 that it receives, or equivalently the sequence number 674 of the next ACK 634 that it expects. When it receives an ACK 634, gaps in the sequence number 674 can be detected and information read from the retransmitted information. Module 604 is required to store its previous ACK information, including whether an "invalid" flag was sent, to enable module 604 to retransmit information contained in previous ACKs 634.

If sequence evaluation unit 646 at module 604 determines based on sequence numbers 664 that it did not receive at least one previously transmitted message 630, acknowledgement unit 648 indicates this in the appropriate second reply 678 or third reply 680. In this case, as before, sequence evaluation unit 646 module 604 determines that a gap occurred based on sequence numbers 664 received. Sequence evaluation unit 644 at module 602 similarly determines that a gap occurred based on sequence numbers 674 received and reads the "invalid" flag that was transmitted in one or both of second reply 678 and third reply 680. Module 602 resynchronizes itself with module 604 based on the indication of which messages 630 were lost. Synchronization may be achieved by such means as discarding information relating to lost messages 630 or retransmitting lost messages 630. Module 602 is required to store its previous message information if it is to retransmit previously transmitted messages 630.

FIG. 6A illustrates three scenarios, wherein time axis 670 demarks times of transmission of messages 630 and ACKs 634 between modules 602 and 604.

In a first scenario, a normal, successful series of messages 630 and ACKs 634 are exchanged between modules 602 and 604. At time 702, module 602 generates and transmits message 630(29) to module 604 over communications link 606, indicated by arrow 632(29). Message 630(29) comprises a sequence number 664(29) and a message payload 666(29) which contains the instructions for module 604. Message 630(29) arrives at module 604. Sequence evaluation unit 646 at module 604 reads sequence number 664(29) and determines that no message gap has occurred.

At time 706, acknowledgement unit 648 generates ACK 634(29) and populates it with sequence number 674(29) and replies 676(29), 678(29), 680(29). First reply 676(29) contains the acknowledgement response for message 630(29) (indicated by "A29"); second reply 678(29) contains the acknowledgement response for the previous message, message 630(28) (not shown) (indicated by "A28"); third reply 68 (29) contains the acknowledgement response for the next previous message, message 630(27) (not shown) (indicated by "A27"). Module 604 transmits ACK 634(29) to module 602, indicated by arrow 636(29), which arrives at time 710. Module 602 receives ACK 634(29) and sequence evaluation unit 644 reads sequence number 674(29) and determines that no message gap has occurred.

A second scenario illustrates an example of a message 630 being lost en route to module 604. At time 704, module 602 generates and transmits message 630(30) over communications link 606, indicated by arrow 632(30). Fault 642 prevents message 630(30) from arriving at module 604. Device 600 deals with this fault 642 in a similar manner as that of device 300, providing the "invalid" flag in second reply 678(31) as part of ACK 634(31) to the next message 630(31). Module 604 generates a value for sequence number 674(31) that indicates a gap in the sequence of ACKs 634. This is most easily achieved by copying the value for sequence number 664(31) from message 630(31).

Sequence evaluation unit 644 at module 602 checks for gaps in the sequence of sequence numbers 674 received in ACKs 634. Sequence evaluation unit 644 determines that a gap has occurred and the last ACK 634(30) was not received. Accordingly, module 602 reads the "invalid" flag from second reply 678(31) which indicates that ACK 634(30) was not generated since message 634(30) was not received by module 604. Module 602 then resynchronizes itself with module 604. In this example, module 602 retransmits the processing parameters from message 630(30) in a message 630(33), indicated by "M30" in message payload 666(33) which was originally transmitted in message payload 666(30) of message 630(30). It will be appreciated that module 602 may resynchronize itself with module 604 by other means including discarding information relating to message payload 666(30).

It will also be appreciated that modules 602 and 604 can be adapted to track loss of a number of consecutive messages 630, as the illustrated embodiment of ACK 634 is able to indicate the loss of two consecutive messages 630 to module 604.

A third scenario illustrates an example of a series of ACKs 634 being lost en route to module 602. At time 708 and time 714, module 602 generates and transmits messages 630(32) and 630(33), respectively, to module 604. Sequence evaluation unit 646 of module 604 determines that no message gap has occurred and acknowledgement unit 648 generates ACKs 634(32) and 634(33), respectively. Module 604 transmits these ACKS 634 over communications link 606, indicated by arrows 636(32) and 636(33), respectively. Faults 640(i) and 640(ii) prevent ACKs 634(32) and 634(33) from arriving at module 602. At time 716, module 602 generates and transmits message 630(34) to module 604 over communications link 606, indicated by arrow 632(34). Message 630(34) comprises a sequence number 664(34) and a message payload 666(34) which contains processing parameters for module 604. Message 630(34) arrives at module 604. Sequence evaluation unit 646 determines again that no message gap has occurred. At time 720, acknowledgement unit 648 generates ACK 634(34) and populates it with sequence number 674(34) and replies 676(34), 678(34), 680(34). First reply 676(34) contains the acknowledgement response for message 630(34) (indicated by "A34"); second reply 678(34) contains the acknowledgement response for the previous message 630(33) (indicated by "A33"); and third reply 680 (34) contains the acknowledgement response for the next previous message 630(34) (indicated by "A32"). Module 604 transmits ACK 634(34) to module 602, indicated by arrow 636(34), which arrives at time 724.

Sequence evaluation unit 644 of module 602 checks for a gap in the sequence of sequence numbers 674 received. Sequence evaluation unit 644 determines that a gap has occurred and that the last two ACKs 634(32) and 634(33) were not received. Accordingly, module 602 reads second reply 678(34) and third reply 680(34) from ACK 634(34). Module 602 is therefore provided with acknowledgement responses to messages 630(32) and 630(33) that were lost due to faults 640(i) and 640(ii), respectively.

It will be appreciated that ACK 634 may be further extended to carry more than three acknowledgement responses to provide support for the loss of more than two consecutive messages 630 or ACKs 634.

In other embodiments, it will be appreciated that the sequence number system may be replaced with any ordered set of codes. Further, in other embodiments, ACKs may be populated with a sequence number of a previously responded to message in any one of the already described reply fields. In such an embodiment, the ACK contains two sequence numbers, thereby allowing direct determination of lost packets by exemplary modules 302, 602 by simply extracting and comparing the values of the two sequence numbers. In still other embodiments, modules 304 and 604 may be modified to report in the ACK directly when there is a loss of a sent packet from modules 302 and 602. Therein, modules 304 and 604 would track sequence numbers from received messages and determine whether gaps in sequence numbers are present. Upon detection of any such gap, a special message may be sent to modules 302 and 602 to immediately notify them of the missing message.

The embodiments described above may be implemented in software, firmware or hardware modules which have access to a cell stream and the required functionality to analyze the cell stream and insert data therein. Such extraction analysis and insertion techniques may incorporate techniques already known in the art, but having the additional functionality defined herein.

It is noted that those skilled in the art will appreciate that various modifications of detail may be made to the present embodiment, all of which would come within the scope of the invention.

We claim:

1. A method for tracking transmission of acknowledgement messages sent from a receiving module to a transmitting module in a communication device, said method comprising the steps of:
   (a) receiving an acknowledgement message sent from said receiving module to said transmitting module for a received message sent from said transmitting module to said receiving module, said acknowledgement message including an indication as to whether a previous message, sent from said transmitting module to said receiving module immediately before said received message, was received by said receiving module;
   (b) determining whether said acknowledgement message was received by said transmitting module in sequence with respect to a previous acknowledgement message sent from said receiving module;
   (c) if said acknowledgement message was not received in sequence, evaluating said indication to determine whether said previous message was received by said receiving module; and,
   (d1) if said acknowledgement message was not received in sequence and if said indication indicates that said previous message was not received by said receiving module, synchronizing an internal state of said transmitting module to reflect loss of said previous message.

2. The method of claim 1 wherein said received and previous messages are control messages.

3. The method of claim 1 wherein said communication device includes both said transmitting and receiving modules.

4. The method of claim 1, said method further comprising the step of:
   (d2) if said acknowledgement message was not received by said transmitting module in sequence and if said indication indicates that said previous message was received by said receiving module, processing an acknowledgement response for said previous message contained in said acknowledgement message.

5. The method of claim 4, wherein each of said acknowledgement messages is associated with a respective sequence number; and said step (b) includes:
   determining an expected sequence number for said acknowledgement message based on a sequence number of said previous acknowledgement message; and
   if said expected sequence number does not match a sequence number for said acknowledgement message, indicating that said acknowledgement message was not received by said transmitting module in sequence.

6. The method of claim 4, wherein:
   each of said acknowledgement messages is associated with a respective sequence number; and
   said step (b) includes:
   determining an expected sequence number for said previous acknowledgement message based on a sequence number of said acknowledgement message; and
   if said expected sequence number does not match a sequence number for said previous acknowledgement message received by said transmitting module, indicating that said acknowledgement message was not received by said transmitting module in sequence.

7. The method of claim 4, wherein said received and previous messages are associated with packets transmitted from said transmitting module to said receiving module.

8. The method of claim 7, wherein said acknowledgement message includes:
   a first field providing an acknowledgement response for said received message; and
   a second field providing an acknowledgement response for said previous message.

9. The method of claim 8, wherein said transmitting module allocates memory associated with said received and previous messages transmitted to said receiving module at a time of transmission; and said method further comprising the step of:
   (e) reallocating said memory in response to said acknowledgement responses of said first field and said second field.

10. The method of claim 9, wherein said acknowledgement response for said previous message and said acknowledgement response for said received message indicate, respectively, whether said previous message and said received message were accepted by said receiving module.

* * * * *